July 9, 1929.

W. H. SCHULZE 1,720,380

LIQUID HANDLING DEVICE

Filed Feb. 17, 1926

Inventor
William H. Schulze.

By Pierce and Sweet

Attys.

Patented July 9, 1929.

1,720,380

UNITED STATES PATENT OFFICE.

WILLIAM H. SCHULZE, OF CHICAGO, ILLINOIS, ASSIGNOR TO ALEMITE MANUFACTURING CORPORATION, OF CHICAGO, ILLINOIS, A CORPORATION OF DELAWARE.

LIQUID-HANDLING DEVICE.

Application filed February 17, 1926. Serial No. 88,836.

My invention relates to liquid handling devices and more especially to installing means for placing such devices in a conduit system and for removing them quickly and conveniently for replacement, repair or cleaning. I have illustrated my invention as applied to a filter for gasoline.

Among the objects and advantages of the invention may be enumerated:

First, the quick and easy removal and replacement of the filter itself; and

Second, automatic readjustment of the conduit system by removal of the filter to prevent loss of liquid from said system due to such removal.

Further objects and advantages of the invention will become apparent as the description proceeds.

Figure 1:
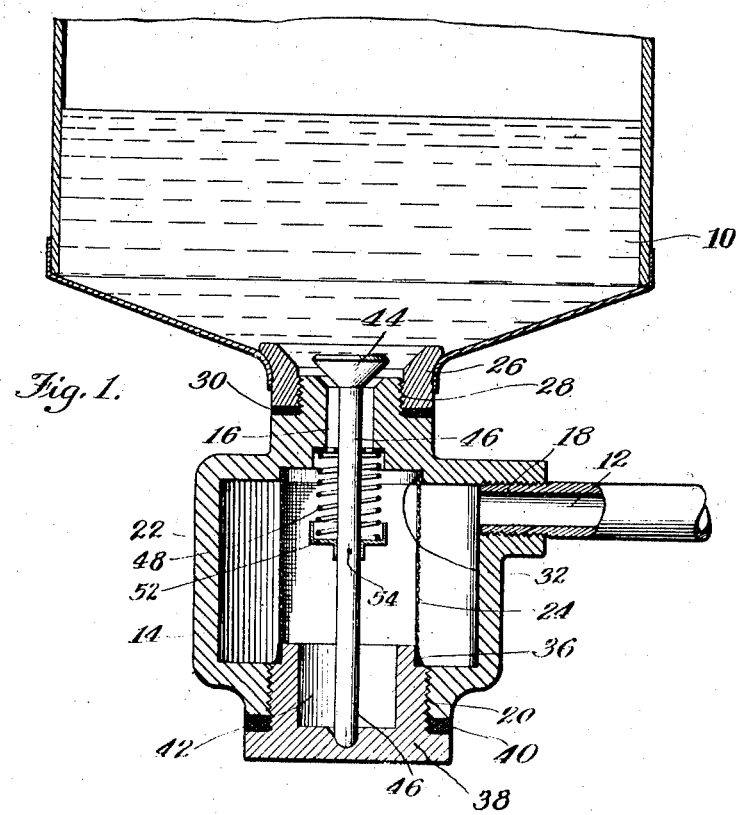
Figure 1 is a more or less diagrammatic section of a portion of a fuel feed system for the internal combustion power plant of a motor vehicle, indicating the application of my invention thereto.
Figure 2:
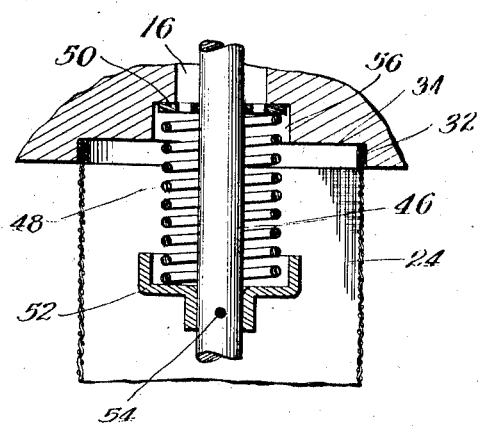
Figure 2 is an enlarged section of the valve closing means and associated parts.

In the embodiment of the invention selected for illustration the container 10 holds a mass of liquid material to be delivered through the delivery pipe 12. In the case of a fuel feed system for motor vehicles the container 10 will be the vacuum tank, or its equivalent, and the pipe 12 will lead to the carburetor.

The body 14 is provided with an inlet at 16, an outlet to the pipe 12 at 18 and a branch opening at 20 opposite the inlet 16. It defines the chamber 22 within which the filter 24 is housed. A neck piece 26, integrally united to the container 10, is threaded at 28 to receive the threaded end of the body 14, and a sealing gasket 30 is clamped between the outer end of the neck piece 26 and a shoulder on the body 14. The filter comprises a tube of reticulated material having a binding strip 32 around its upper edge. The upper end of the filter fits snugly in the first, shallow countersink 34 in the top wall of the chamber 22. The lower edge of the tube is permanently united, as by soldering, at 36, with the upper end of a plug 38 threaded into the opening 20 with the joint sealed by a gasket 40. The plug is cup-shaped and defines an inner chamber 42 opening upwardly into the inside of the filter but removed from the path of flow of the liquid. It will thus be filled with stagnant material in which sediment and other impurities interrupted by the filter may settle.

It will be apparent that the plug and filter constitute a readily removable unit which may be quickly unscrewed and withdrawn at any time to clean out the accumulated sediment or to be replaced in case it is found that the filter element has broken or is otherwise unfit for further service.

To prevent loss of the contents of the container 10 when the filter is removed, without any attention on the part of the operator, I provide a valve 44 co-operating with a seat at the upper end of the inlet 16 to cut off communication between the container and the chamber 22. The valve is carried by a stem 46 extending down the inlet 16 into the chamber. A compression spring 48, having abutment at its upper end on a spider 50 and at its lower end on a cup 52 fastened on the stem 46, as by a pin 54, urges the valve toward closed position at all times. The spider 50 rests in a second countersink 56 in the bottom of the countersink 34 and has an appreciable radial clearance to allow the valve 44 to seat squarely. I prefer to provide this clearance at the outer edge of the spider, as clearance at the inner edge might let the valve rattle or buzz, when in the position of Figure 1 and with the whole device mounted on a support subjected to more or less vibration.

The stem 46 extends clear through the chamber 22 and axially along the branch opening 20 to abut the bottom of the cup 42 when the plug is put in place. This abutment lifts the valve 44 when the plug and filter are assembled in the chamber. It will be noted that the axial movement necessary to close the valve 44 is less than that necessary to unscrew the plug 38 so that the valve will close before the plug is completely removed, and will not be opened until after it is partially inserted.

Without further elaboration the foregoing will so fully explain the gist of my invention, that others may, by applying current knowledge, readily adapt the same for use under various conditions of service, without eliminating certain features which may properly be said to constitute the essential items of novelty involved, which items are intended to be defined and secured to me by the following claims.

I claim:

1. Liquid handling means comprising a chamber having an inlet and outlet, a branch opening opposite said inlet, a removable plug for closing said branch opening, a tubular filter element carried by said plug to extend across said chamber and separate said inlet and outlet when said plug is in place, a valve in said inlet, spring means tending to close said valve, a valve stem extending across said chamber inside said filter element and forming a mechanical contact connection between said plug and valve for holding said valve open when said plug is in place, the inner surface of said plug being cup-shaped to form a bottom space for stagnant liquid in which sediment can accumulate without clogging said filter element.

2. Liquid handling means comprising a chamber having an inlet and an outlet, a branch opening opposite said inlet, a removable plug for closing said branch opening, a tubular filter element carried by said plug to extend across said chamber and separate said inlet and outlet when said plug is in place, a valve in said inlet, spring means tending to close said valve, a valve stem extending across said chamber inside said filter element and forming a mechanical contact connection between said plug and valve for holding said valve open when said plug is in place.

3. In a device of the class described, a receptacle having inlet and discharge openings, a hollowed plug removably secured in the bottom of said receptacle to form a settling chamber, a filter element secured to said plug and normally positioned between said inlet and discharge openings, a valve in said inlet opening, and resilient means engageable with the bottom of the settling chamber and operable to close said valve upon removal of said settling chamber.

4. In a device of the class described, the combination of a body having inlet and outlet passage-ways, said body having a drain opening, a cupped drain plug removably secured in said drain opening, an upwardly opening valve in said inlet passage-way, a stem rigid with said valve and having its lower end resting in a recess in the bottom of said plug, a collar secured to said stem and a compression spring confined between said collar and the top of said body.

In witness whereof, I hereunto subscribe my name this 13 day of February, 1926.

WILLIAM H. SCHULZE.